United States Patent [19]

Sugimoto et al.

[11] Patent Number: 4,507,046
[45] Date of Patent: Mar. 26, 1985

[54] ARTICULATED INDUSTRIAL ROBOT

[75] Inventors: Noboru Sugimoto, Yokosuka; Yoshio Matsumoto, Yokohama; Michio Takahashi, Yokohama; Michinaga Kohno, Yokohama; Shiyuki Sakaue, Yokohama, all of Japan

[73] Assignee: Hitachi, Ltd., Tokyo, Japan

[21] Appl. No.: 285,637

[22] Filed: Jul. 21, 1981

[30] Foreign Application Priority Data

Jul. 21, 1980 [JP] Japan ................................ 55-98759

[51] Int. Cl.³ .............................................. B25J 9/00
[52] U.S. Cl. ...................................... 414/735; 414/4; 901/15; 901/29; 901/49
[58] Field of Search ................ 414/729, 735, 738–741, 414/744, 4; 901/15, 26, 29, 49

[56] References Cited

U.S. PATENT DOCUMENTS

| | | | |
|---|---|---|---|
| 3,247,979 | 4/1966 | Melton et al. | 414/4 X |
| 4,273,506 | 6/1981 | Thomson et al. | 414/739 X |
| 4,275,986 | 6/1981 | Engelberger et al. | 414/739 X |

FOREIGN PATENT DOCUMENTS

| | | | |
|---|---|---|---|
| 44548 | 1/1982 | European Pat. Off. | 414/738 |
| 2483300 | 12/1981 | France | 414/729 |
| 577030 | 5/1958 | Italy | 414/739 |

OTHER PUBLICATIONS

Kuka UK Ltd., "Robots", The Engineer, p. 10, 3/1979.

*Primary Examiner*—Robert J. Spar
*Assistant Examiner*—Terrance L. Siemens
*Attorney, Agent, or Firm*—Antonelli, Terry & Wands

[57] ABSTRACT

An articulated industrial robot comprising a supporting post mounted on a base; a forearm provided at its end with a wrist having at least one degree of freedom; a pair of upper arms pivotally connected at their one ends to the supporting post and at their other ends to the forearm, the upper arms being disposed in parallel with each other at both sides of the supporting post and the forearm; an upper arm rotary driving source mounted in the supporting post; an upper arm connecting mechanism for connecting the output of the upper arm rotary driving source to the upper arm through a reduction gear; a forearm rotary driving source mounted on one of the upper arms; a forearm connecting mechanism for connecting the output of the forearm rotary driving source to the forearm through a reduction gear; a wrist posture controlling rotary driving source provided on the other upper arm or on the supporting post; and a wrist posture controlling connecting mechanism for connecting the output of the wrist posture controlling rotary driving source to the wrist through the other upper arm and through the forearm through a reduction gear.

3 Claims, 22 Drawing Figures

ARTICULATED INDUSTRIAL ROBOT

BACKGROUND OF THE INVENTION

The present invention relates to an articulated industrial robot.

Figure 1:
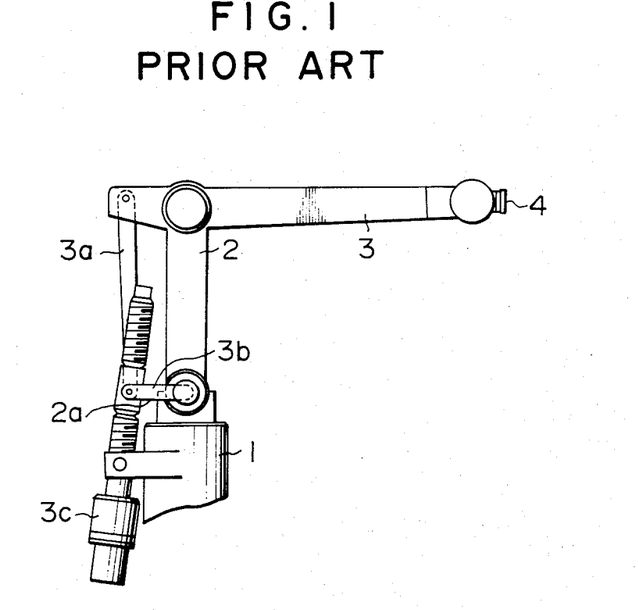
FIG. 1 is a partial side elevational view of a conventional articulated industrial robot.

FIG. 1 shows a conventional articulated industrial robot. This conventional articulated industrial robot has an arm constituted by an upper arm 2 and a forearm 3. A driving source 3c for driving, through a feed screw mechanism, parallel link mechanism 3a, 3b connected to the forearm 3, is secured to a rotary support 1 such as a turret for rotatably supporting the upper arm 2. Also, a driving source for a feed screw mechanism for actuating a lever 2a unitarily connected to the upper arm 2 is secured to the rotary support 1, although it is hidden behind the driving source 3c and not shown in this figure. The arrangement is such that the power from a power source is converted into the movement of the forearm 3 through the action of the link mechanism 3a, 3b and feed screw mechanism.

Figure 2:
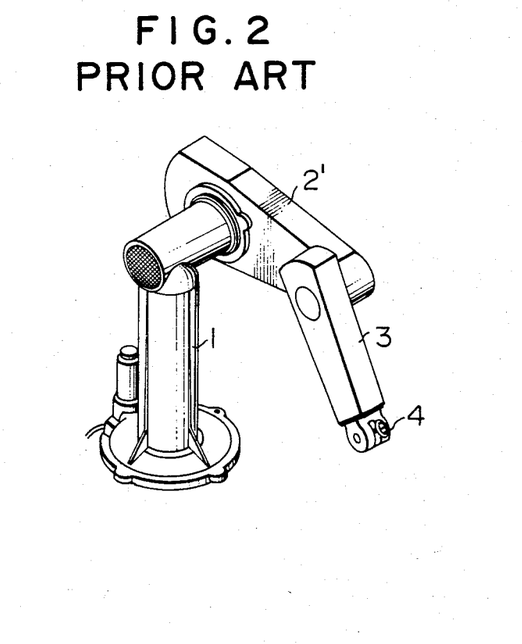
FIG. 2 is a perspective view of another conventional articulated industrial robot.

FIG. 2 shows another type of conventional articulated industrial robot. This type of industrial robot has a forearm 3 adapted to be driven by a driving source which is secured to an upper arm 2', in such a manner that the forearm 3 is moved relatively to the upper arm 2. The later-mentioned type of conventional articulated industrial robot has an advantage that the mechanical restriction to the stroke or range of operation is small to afford a large stroke or range of operation over the first-mentioned type of known articulated industrial robot.

A wrist 4, having at least one degree of freedom, is secured to the end of the forearm 3 of each of the robots explained hereinbelow.

Figures 3, 4:
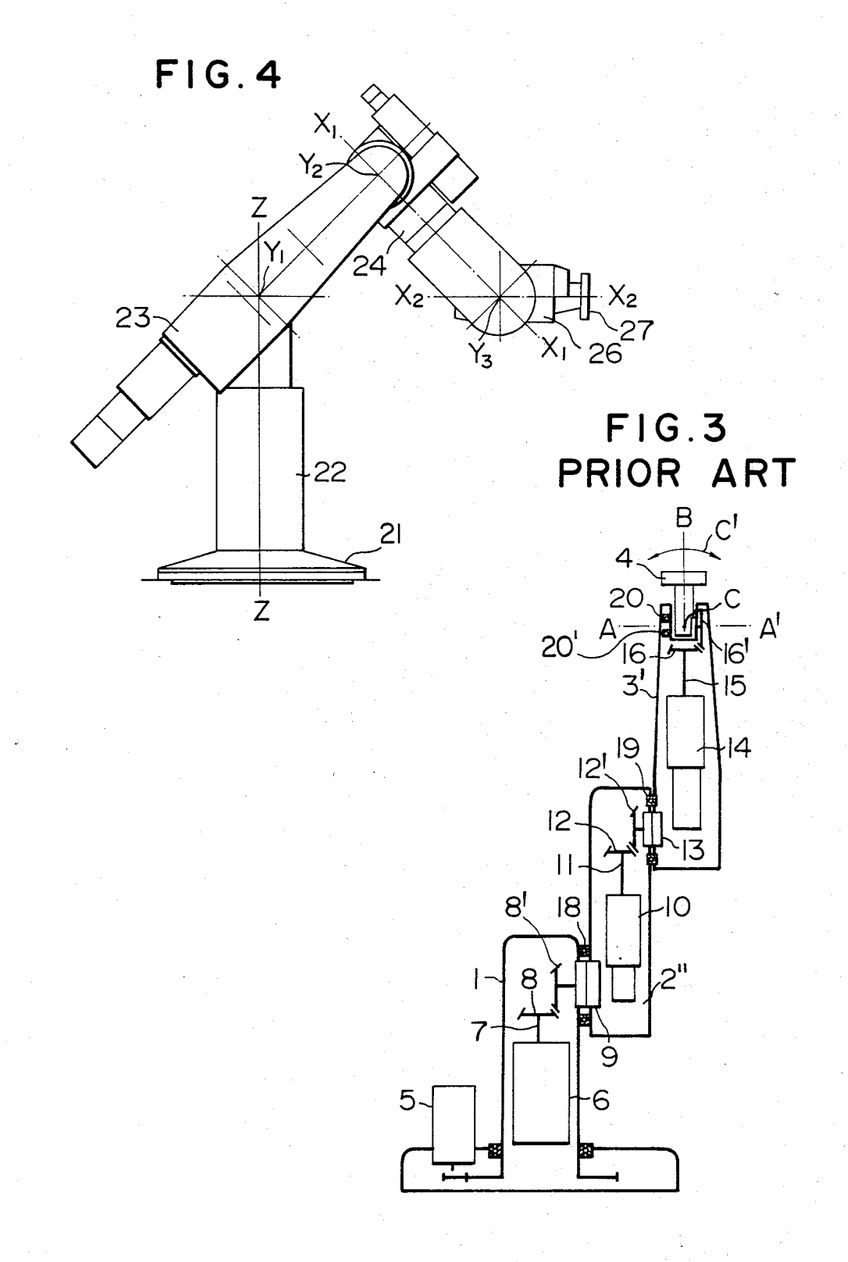
FIG. 3 is an illustration of driving mechanism for arms and wrist of still another conventional articulated industrial robot.
FIG. 4 is a schematic side elevational view of an articulated industrial robot in accordance with an embodiment of the invention.

In the known articulated industrial robots, the driving source and the driving system for the upper arm 2", forearm 3', and the wrist 4 are arranged, for example, in a manner shown in FIG. 3. Namely, the upper arm 2" is rotatably supported at one end thereof by the rotary support 1 through the medium of a bearing 18. A driving source 6 such as a D.C. servo motor, for driving the upper arm 2", is secured to the rotary support 1. The torque of the driving source 6 is transmitted to a reduction gear 9, such as a harmonic reduction gear, through a rotary shaft 7 and a pair of bevel gears 8, 8', and the output side of this reduction gear 9 is connected to the upper arm 2". The forearm 3' is rotatably secured to the other end of the upper arm 2' through a bearing 19. A driving source 10, such as a D.C. servo motor for driving the forearm 3', is attached to the upper arm 2". The torque of this driving source 10 is transmitted to a reduction gear 13, such as a harmonic reduction gear, fixed to the upper arm 2", through a rotary shaft 11 and a pair of bevel gears 12, 12'. The output side of the reduction gear 13 is connected to the forearm 3'. The wrist 4 is rotatably secured to the end of the wrist 3' through bearings 20, 20', and is adapted to be driven by a driving source 14 such a D.C. servo motor attached to the forearm 3. The torque of this driving source is transmitted, through a rotary shaft 15 and a pair of bevel gears 16, 16', to a reduction gear (not shown), such as a harmonic reduction gear, the output shaft of which is connected to the wrist 4, to thereby drive the wrist 4. Although the wrist 4 is shown in FIG. 3 to have only one degree of freedom, i.e. the rotation around an axis A—A', the wrist 4, in an ordinary articulated industrial robot, has two or more degrees of freedom including a rotation around an axis B or a rotation or pivoting around a point C (shown by arrow C') in combination. In the articulated robot of the type shown in FIG. 3 in which the driving source 10 for driving the forearm 3' is secured to the upper arm 2", the driving source for achieving each of above-mentioned degree of freedom is secured to the forearm 3' as in the case of the driving source 14 shown in the drawing, and achieves rotary motion around its own axis of rotation by making use of a differential gear mechanism.

Namely, in the articulated robots of the types explained heretofore, the forearm 3 or 3' and the wrist 4 are driven independently relatively to the upper arm 2, 2' or 2" and the forearm 3 or 3', respectively, and the positions or postures of the forearm 3 or 3' and the wrist 4 are controlled through the control of their positions relative to the upper arm and the forearm, respectively. In other words, the posture of the wrist 4 is affected by the postures of the upper arm and the forearm. Therefore, in order to move the wrist 4 while maintaining the latter in a predetermined relation to an absolute reference plane such as floor surface, platform or the like, it is necessary to effect the control of the wrist 4 in such a manner so as to compensate for the change of postures of the upper arm and the forearm.

In practical use of the industrial robot, there are many tasks to be performed by the robot. Some of these tasks require complicated motion of the wrist 4, but there still are many types of tasks which require substantially linear motion of the wrist 4 in only one direction, e.g. assembling of parts, shifting of goods, packing and so forth, as well as tasks which require the wrist 4 to be maintained substantially in the constant posture in relation to the working surface, e.g. marking on a flat surface, application of an adhesive and so forth. The budget for automation of such comparatively simple tasks is usually limited. In the known articulated industrial robots explained hereinbefore, however, it is necessary to control the posture of the wrist 4 making use of the wrist driving source 14 in order to maintain the wrist 4 in a constant posture relative to the working surface, which, in turn, requires the wrist 4 to have the necessary degrees of freedom to meet the demands of complicated robot tasks. In these known articulated industrial robots, therefore, it is quite difficult to reduce the production cost of robot and to facilitate the control of the wrist by eliminating driving sources, driving system and controller which are unnecessary for the simplified robot tasks of smaller degree of freedom.

In addition, since the known articulated robots incorporated a plurality of driving sources for imparting to the wrist a plurality of degrees of freedom, as well as differential gear systems, the change in the degree of freedom of the wrist 4 cannot be achieved without being accompanied by a large scale of modification including the modification of construction of the forearm 3 itself. It is, therefore, extremely difficult to easily change the combination of degrees of freedom to meet various requirements or expected robot tasks.

SUMMARY OF THE INVENTION

Accordingly, an object of the invention is to provide an articulated industrial robot which permits an easy control of posture of the wrist and easy elimination of unnecessary degrees of freedom or change of combination of degrees of freedom in compliance with the demands, such elimination of unnecessary degrees of freedom or change of combination of degrees of freedom being made through a partial modification of the robot without necessitating change of major constituents of the robot, thus achieving simultaneously both of sufficient function and economy, to thereby overcome the above-described problems of the prior art.

To this end, according to the invention, there is provided an articulated industrial robot comprising: a base; a supporting post provided on the base; a forearm provided at its one end with a wrist having at least one degree of freedom; a pair of upper arms pivotally connected at their one ends to the supporting post and at their other ends to the forearms and disposed at both sides of the supporting post and the forearm; a forearm connection mechanism mounted on one of the upper arms and including a forearm rotation driving source, rotary shaft and gears or a winding type transmission such as a belt or chain and pulley transmission; and a wrist posture controlling rotary driving source mounted, when the control of wrist posture is necessary, on the other of said upper arms together with a connecting mechanism. For such demands such as maintaining the wrist in a constant posture to a reference plane, the wrist posture controlling rotary driving source is eliminated and the end of the connecting mechanism is directly connected to the supporting post.

According to the arrangement the present invention, it is possible to obtain at a low cost such an articulated industrial robot so as to permit an easy change of degrees of freedom to meet various demands.

Thus, according to the invention, the articulated industrial robot can have an adaptability to both demands of control of the posture of the wrist and holding the wrist in a constant posture, the change between these two modes can easily be attained simply by changing one of the upper arms.

It is also to be noted that, according to the invention, it is possible to obtain an additional degree of freedom by constructing the supporting post with a turret which is rotatably supported by the base and connected through a reduction gear to a rotation driving source which, in turn, is mounted on the base, so that is becomes possible to transport an article over a long distance to process or assemble the article.

In addition, in the articulated industrial robot of the invention, it is possible to obtain, simply by replacing only the forearm rotatable around the longitudinal axis, an additional degree of freedom to permit an inversion of the tool or the like, without losing initial degrees of feedom.

Furthermore, by changing only the forearm stretchable in the longitudinal direction, it is possible to convey a workpiece or a part to be assembled, detouring above or around any obstruction around the robot, while maintaining the articulated robot itself stationed, thereby permitting a processing or assembling over a long distance.

By providing an arrangement such that the base is driven by power derived from the driving source to run along a track in synchronization with the other machines such as conveyor, it is possible to effect the processing or assembling while maintaining the flow of workpiece or parts, to thereby remarkably improve the efficiency of the work.

Finally, it is to be noted also that, according to the invention, rotary driving source such as D.C. servo motor is used as the driving source for controlling the posture of the wrist and other purposes, while the connecting mechanism for upper arm, connecting mechanism for forearm and the wrist posture connecting mechanism are constituted only by rotary parts such as rotary shafts and bevel gears, and the reduction gears are provided at the portion of the system near the output end. Consequently, the power of loss in the transmission system is reduced and the connecting mechanisms are standarized and simplified to permit a remarkable reduction of the production cost of the articulated industrial robot.

BRIEF DESCRIPTION OF THE DRAWINGS

FIG. 5b is a sectional view taken along the line V—V of FIG. 5a;

FIG. 6 is a developed sectional view of a modification of the articulated industrial robot shown in FIG. 5a;

FIG. 7 is a developed sectional view of still another modification of industrial robot shown in FIG. 5a;

FIG. 11a is a developed sectional view of an articulated industrial robot of a different embodiment from that shown in FIG. 5a;

FIG. 11b is a sectional view taken along the line XI—XI of FIG. 11a;

FIG. 15 is a sectional detailed illustration of a modification of the articulated industrial robot shown in FIG. 5a;

DESCRIPTION OF THE PREFERRED EMBODIMENTS

Figure 5A:
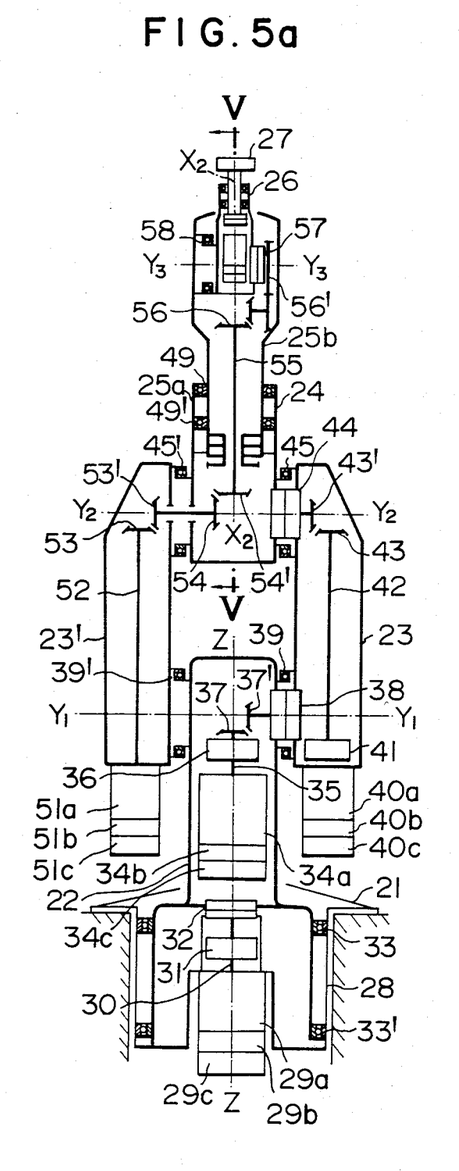
FIG. 5a is a detailed developed sectional view of the articulated industrial robot shown in FIG. 4.
Figure 5B:
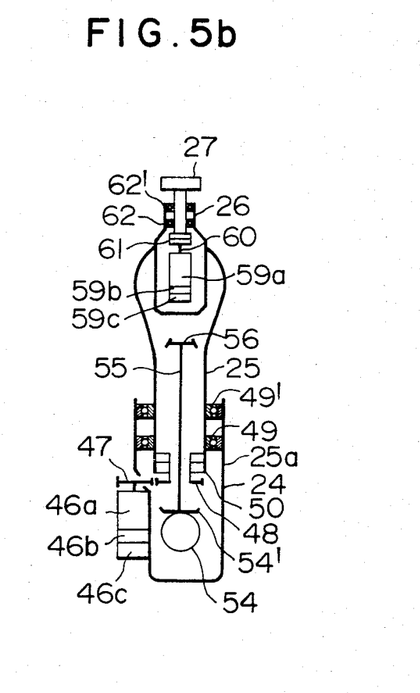

Referring now to the drawings wherein like reference numerals are used throughout the various views to designate like parts and, more particularly, to FIGS. 4 and 5b, according to these figures, an articulated industrial robot includes a base 21, a turret 22, upper arms 23, 23', forearm 24 and a wrist 26. The robot of this embodiment has 6 degrees of freedom: namely a rotation around a Z axis, rotation of upper arms 23, 23' around $Y_1$ axis, rotation of forearm 24 around $Y_2$ axis, rotation of lower half part 25b of forearm 24 around the $X_1$ axis, rotation of wrist 26 around $Y_3$ axis, and rotation of tool mount 27 around the $X_2$ axis.

FIG. 5a illustrates the driving system for each motion, in the state in which the upper arm 23 and the forearm 24 of the robot shown in FIG. 4 are stretched. More specifically, the turret 22, rotatably supported by the base 21 through rotary bearings 33, 33', and the output shaft 30 of a rotary drive source 29a, such as a D.C. servo motor, fixed to the base 21, is connected to a reduction gear 32, such as a harmonic reduction gear fixed to the base 21, through a safety brake 31, such as solenoid brake which is actuated when the current supplied thereto is turned off, which is also fixed to the base 21. The low-speed side, i.e. the output side of the reduction gear 32 is fixed to the turret 22, so that the rotary drive source 29a imparts to the turret 22 a rotation around the Z axis as shown in FIGS. 4 and 5a.

A rotary driving source, 34a such as D.C. servo motor, for driving the upper arm 23, is mounted in the turret 22. The output shaft 35 of the rotary driving source is connected, through a safety brake 36 and a pair of bevel gears 37, 37', to a reduction gear 38 fixed to an upper part of the turret 22. The pair of upper arms 23, 23' are rotatably secured to an upper portion of the turret 22 through respective rotary bearings 39, 39'. The low speed output of the reduction gear 38 is connected to one 23 of the upper arms 23 so that the rotary driving source 34a imparts to the upper arms 23, 23' the rotation around the $X_1$ axis shown in FIG. 5a.

A rotary driving source 40a, such as a D.C. servo motor, for driving the forearm 24, is attached to the rear end of the upper arm 23. The output shaft 42 of the driving source 40a is connected, through a safety brake 41 and a pair of bevel gears 43, 43', to a reduction gear 44, fixed to the end of the upper arm 23. An upper half part 25a is the forearm 24 of rotatably clamped between the upper arms 23, 23' through respective rotary bearings 45, 45', and is connected to the low speed output of the reduction gear 44. Consequently, the rotary driving source 40a, attached to the rear end of the upper arm 23, imparts to the upper half part 25a of the forearm 24 the rotation around the $Y_2$ axis as shown in FIGS. 4 and 5a.

To the end of the upper half part 25a of the forearm 24, the lower half part 25b of the forearm is mounted rotatably through bearings 49, 49', for free rotation around the $X_1$ axis as shown in FIG. 4. A gear 47 is attached to the output shaft of a rotary driving source 46a, such as D.C. servo motor, fixed to the upper half part 25a of the forearm. Another gear 48, fixed to the input shaft of a reduction gear 50 which, in turn, is fixed to the upper half part 25a, has a low speed output connected to the lower half part 25b of the forearm. These gears 47 and 48 mesh with each other so that the rotary driving source 46a causes the lower half part 25b of the forearm to rotate around the $X_1$ axis.

The driving system constituted by the rotary driving source 40a, for driving the upper half part 25a of the forearm, output shaft 42, bevel gears 43, 43' and so forth, is mounted only on the upper arm 23 of the two upper arms 23, 23'. To the rear end of the other upper arm 23', is fixed a rotary driving source 51a, such as D.C. servo motor, for driving the wrist 26. The output shaft 52 of this rotary driving source 51a is introduced through a pair of bevel gears 53, 53'; into the upper half part 25a and further to the end portion of the lower half part 25b of the forearm 24 through another pair of bevel gears 54, 54' (FIG. 5b) and the rotary shaft 55. The wrist 26 is rotatably secured to the lower half part 25b of the forearm 24 through a rotary bearing 58. A reduction gear 57, fixed to the lower half part, has a low-speed output coupled to the wrist 26. The rotary shaft 55 is connected at its end to the input shaft of the reduction gear 57 through bevel gears 56, 56', so that the rotary driving source 51a fixed to the rear end of the upper arm 23' imparts to the wrist 26 a rotation around the $Y_3$ axis as shown in FIGS. 4 and 5a. The transmission of power at the inside of the forearm 24 is achieved by a rotary shaft 55 which is coaxial with the axis of rotation of the lower half part 25b of the forearm and extending through a cavity or bore formed in the gear 48 and the reduction gear 50 for driving the lower half part 25b of the lower half part 25b. Therefore, the rotary motion of the lower half part 25b can be achieved without substantially hindering the operation of the driving system.

As shown in FIG. 5b, rotary driving source 59a, such as D.C. servo motor, is mounted on the wrist 26 and has an output shaft 60 connected to the input shaft of the reduction gear 61 fixed to the wrist 26. The low-speed output of the reduction gear 61 is connected to the tool mount 27, rotatably supported by the wrist 26 through rotary bearings 62, 62', so as to impart to the tool mount 27 rotation around the $X_2$ axis as shown in FIGS. 4 and 5a.

Figure 6:
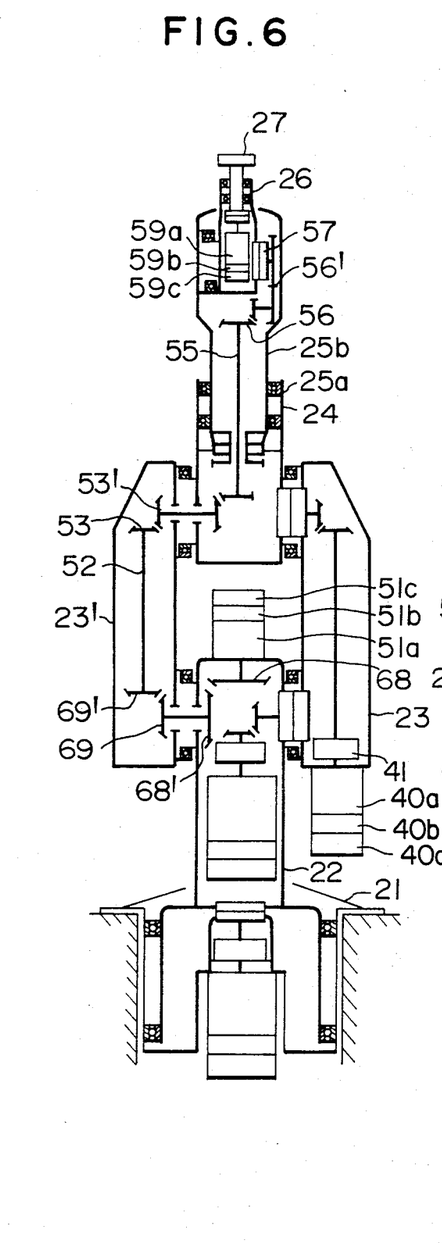
Figure 17:
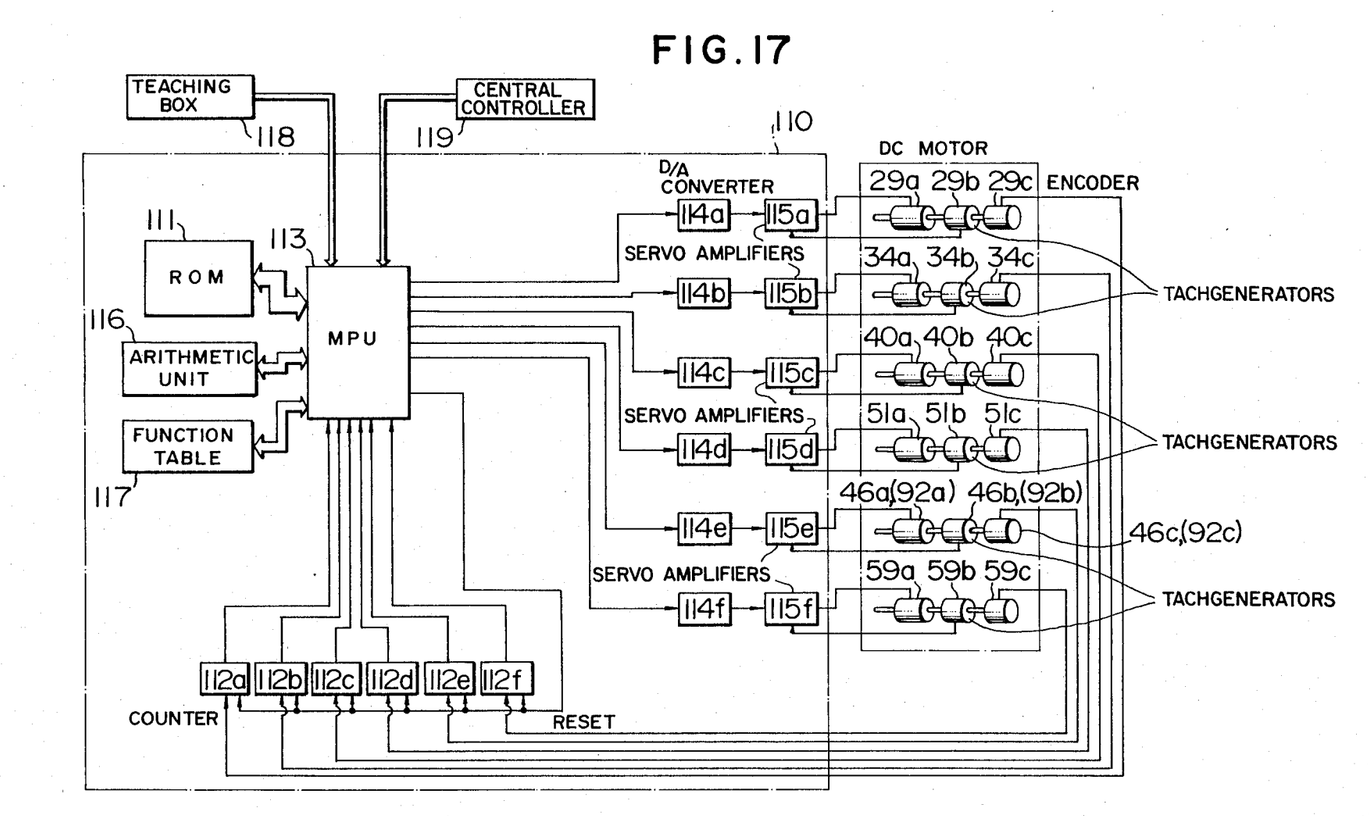
FIG. 17 is a schematic illustration of a controller for controlling the articulated industrial robot of the invention.

Referring now to FIG. 6 showing another embodiment, a rotary driving source 51a, such as a D.C. servo motor, for driving the wrist 26, is fixed to the turret 22. This rotary driving source 51a has an output shaft introduced through bevel gears 68, 68' into the upper arm 23' and drives the wrist 26 through the same mechanism as that used in the embodiment shown in FIG. 5a. As shown in FIG. 17, rotatory encoders or the like devices 29c, 34c, 40c, 46c, 51c, 59c for detecting the rotation amounts, as well as tachogenerators 29b, 34b, 40b, 46b, 51b, 59b, are connected to the rotary driving sources 29a, 34a, 40a, 46a, 51a, 59a. These rotation amount detecting devices 29c, 34c, 40a, 46c, 51c and 59c produce output pulse signals which are counted by respective counters 112a, 112b, 112c, 112d, 112e, 112f, to generate position datum which are fed back to a microprocessor unit 113 adapted to produce compound signals for controlling the posture and position of the tool mount 27.

As stated before, the driving system for driving the wrist 26 in the embodiment of FIG. 6 is extended into the upper arm 23' and the driving source is secured to the upper arm 23' or the turret 22. Therefore, this articulated industrial robot can suitably applied to operations such as assembling of a machine conducted by mounting or insertion of parts in one direction or operations which require the wrist 26 to be held at a constant posture relatively to the reference such as a column, platform or the like, which occurs, for example, in, packing work, shifting work and so forth, by modifying the construction partially as explained hereinunder. As shown, for example, in FIG. 7, the rotary driving source 51a for controlling the posture of the wrist 26 is removed and a gear 64 is attached to one end of the rotary shaft of the wrist driving system provided in the upper arm 23''. A bevel gear 63 meshing with the gear 64 and fixed to the turret 22 limits the operation of the driving system 65, 55. In addition, the reduction gear 57, for rotatively driving the wrist 26 and secured to the lower half part 25c of the forearm 24, is removed while permitting the lower half part 25c to be connected directly to the wrist 26 via the bevel gears 56, 56'. Consequently, the relative motion between the assembly of upper arm 23" and forearm 24 and the wrist driving system 65, 66 functions to negate the displacements of the upper arm 23" and forearm 24, so that the rotation of the wrist 26 around the $Y_3$ axis is achieved while maintaining the wrist 26 at a constant posture relatively to the turret 22.

Figure 7:
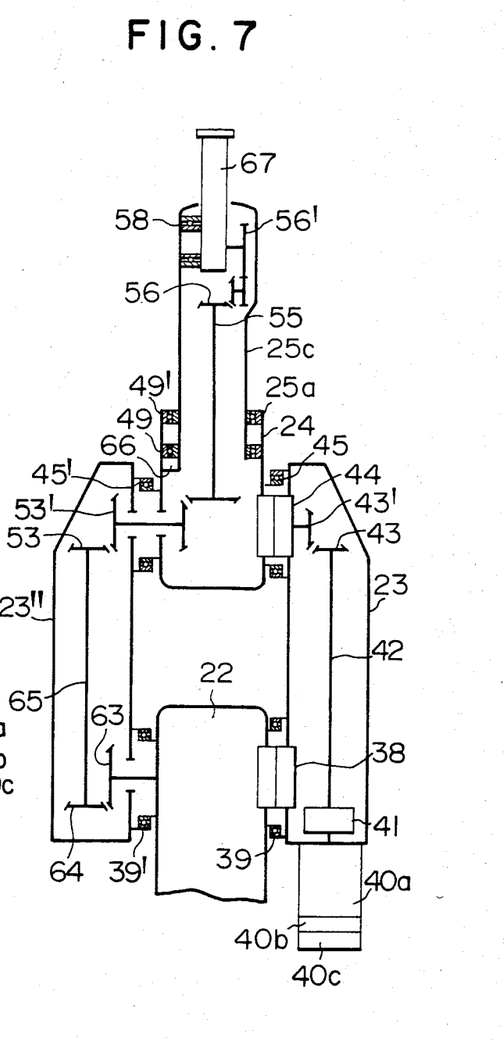

For operations which do not require twisting or rotation of the unit 26 around the $X_1$ axis shown in FIGS. 4 and 5a, the rotary driving source 46a, gears 47, 48 and the reduction gear 50 are removed as shown in FIG. 7, and the lower half part 25a of the forearm 24 is fixed against the rotation relative to the upper half part 25a. By so doing, it is possible to easily obtain a robot mechanism having a reduced degree of freedom. It is possible to use, instead of the bearings 49, 49', a fixing sleeve for fixing the upper half part 25a and the lower half part 25b to each other.

As will be understood from the foregoing description, it is possible to obtain an articulated industrial robot in which the kinds of degree of freedom can easily be varied to suit for various user's demands through a minor change without necessitating the change of construction of the arms and driving system. For instance, the articulated industrial robot can function to hold the wrist 26 in a constant posture with respect to the turret 22 or to an external object, so that the driving sources, reduction gears and corresponding controllers can be eliminated and saved when the robot is required only to carry out simple operations thereby permitting the production of robots at low cost using common major constituents or parts.

Additionally, the controlling system for controlling the wrist 26 and the tool or work mount 27 are completely separated from each other, and the tool mount 27 is mounted on the wrist 26. Therefore, for uses not requiring the rotation of the tool mount 27, the driving source 59, reduction gear 61, and bearings 62, 62' are eliminated and a wrist 67 having a fixed tool mount as shown in FIG. 7 is used in place of the wrist 26. By so doing, it is possible to obtain a reduced cost robot meeting this requirement without substantial change of major parts of the robot.

Furthermore, since the kinds of degree of freedom are independent of one another, it is possible to select a suitable wrist 26 having various combinations of degrees of freedom as shown in FIGS. 8a–8d without requiring substantial change or reform of major parts of the robot.

Figure 8A:
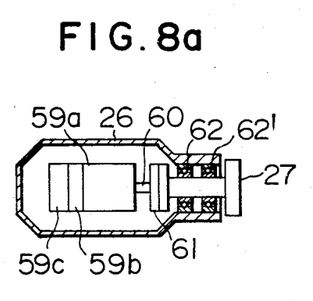
FIGS. 8a to 8d are sectional views of various wrist mechanisms detachable to a wrist of the articulated industrial robot of the invention.
Figure 8B:
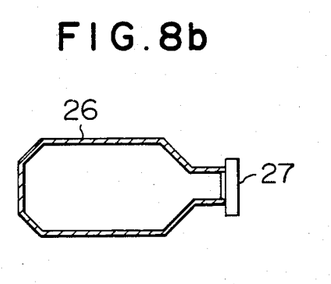
Figure 8C:
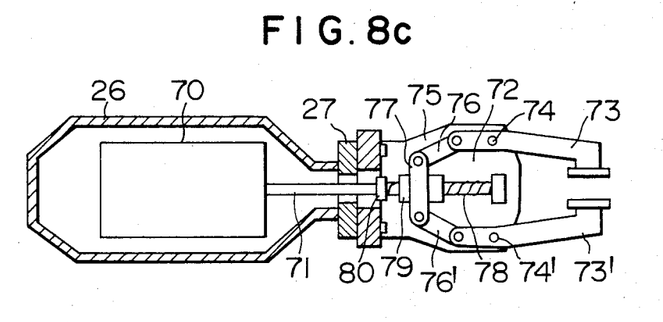

The wrist mechanism shown in FIG. 8a is the one explained before in connection with FIGS. 5a and 5b; namely, a wrist mechanism which accomodates the driving source 59 and reduction gear 61 for rotatively driving the tool mount 27 independently of the body of the wrist 26. The wrist mechanism shown in FIG. 8b is the one described already in connection with FIG. 7, in which the wrist 26 does not accomodate any mechanism and the tool mount 27 is fixed to the end of the wrist 26. In the wrist mechanism shown in FIG. 8c, the tool mount 27 is fixed to the body of the wrist 26 which carries a driving source 70 for the tool, such as a D.C. motor or a pneumatic cylinder. The output shaft 71 of the driving source 70 is exposed to the outside of the tool mount 27. Using this output shaft 71, the users can actuate various tools meeting the demands such as a gripper generally designated by the reference numeral 72, thus reducing the size and weight of the tool 72 as compared with the case where the tool 72 itself carries the driving source. In the example shown in FIG. 8d, the tool 72 is a gripper constituted by a pair of fingers 73, 73' which are rotatably secured to the base 75 by means of pivots 74, 74'. The fingers 73, 73' are pivotally secured at their one ends through link members 76, 76' to an input link 77 fixed to a nut 79 which is adapted to be fed linearly by means of a ball screw 78 connected to the output shaft 71 through a coupling 80. It is, therefore, possible to move the fingers 73, 73' toward and away from each other by the driving source incorporated in the wrist 26.

Figure 8D:
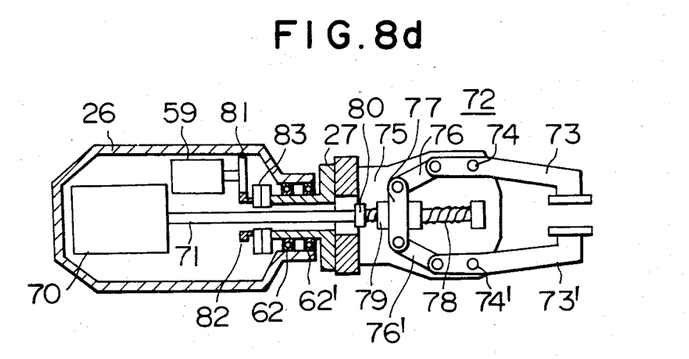

Referring now to FIG. 8d, the driving source 59 for the tool mount 27 and the driving source 70 for the tool 72 are commonly accomodated in the wrist 26. The output shaft 71 of the driving source 70 is extended through the cavities or bores formed in the tool mount 27 and the reduction gear 81. A gear 81 is fixed to the output shaft of the tool mount driving source 59 and meshes with a hollow gear 82 which is connected to the input shaft of the hollow reduction gear 83 thereby to rotatively drive the tool mount 27. The example of the tool shown in FIG. 8d is identical to that shown in FIG. 8c.

As will be understood from the explanation made heretofore, in the embodiment of FIG. 8d the system for driving and controlling the wrist 26 is constructed independently from the system for driving the tool mount 27 which is provided at the end of the wrist 26, and the driving source 59 for the tool mount is carried by the wrist 26. It is, therefore, possible to freely select a wrist having various functions as shown in FIGS. 8a to 8d, without necessitating substantial change in the body of the robot starting from the base 21 to the end of the lower half part 25 of the forearm.

Figure 9:
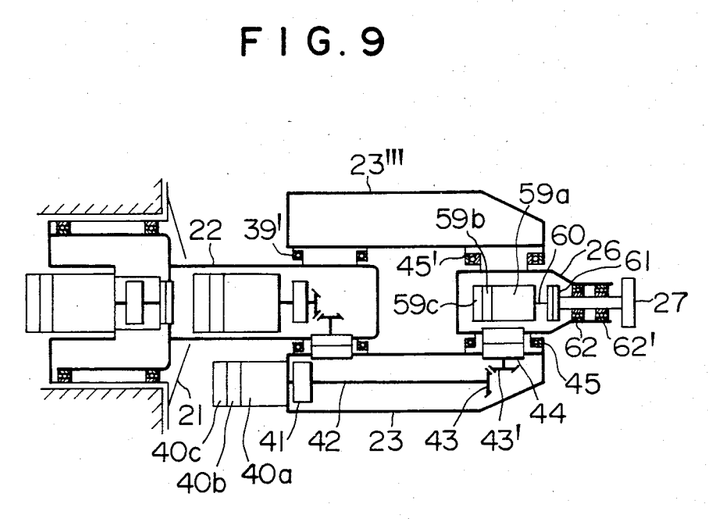
FIG. 9 is a developed sectional view of another form of articulated industrial robot shown in FIGS. 5a, 6 and 7, having no forearm.
Figure 10:
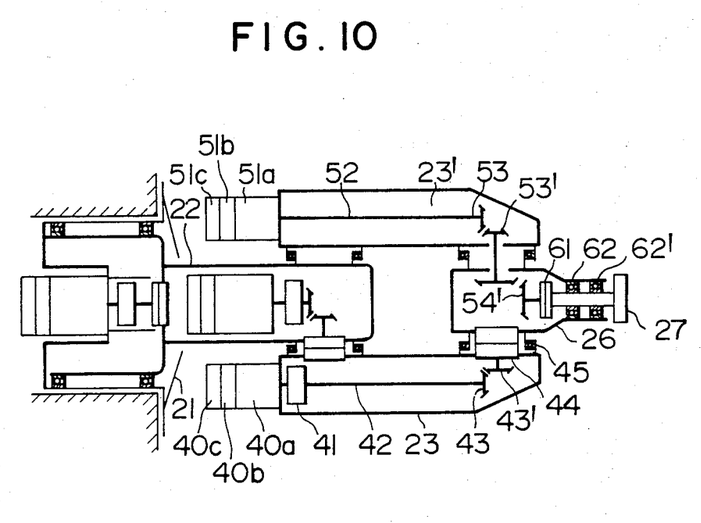
FIG. 10 is a developed sectional view of a different form of articulated industrial robot from that shown in FIG. 9.

For uses wherein the range of operation is limited, the forearm 24 in the above-described robot is omitted as shown in FIG. 9, and any one of the wrists mentioned above having various functions are rotatably secured to the ends of the upper arms 23, 23''' through a bearing. The posture of the wrist 26 is controlled by means of the forearm driving system 40, 42, 43, 43', 44 shown in FIG. 5 or by means of the wrist posture controlling system 63, 64, 65, 53, 53' shown in FIG. 7. This arrangement permits an easy production of robot suited for the desired simple work, using equivalent major parts to those of the robot shown in FIG. 5.

Furthermore, according to the described arrangement, it is possible to make use of the wrist posture controlling system 51, 52, 53, 53' shown in FIG. 5 for the control of posture of the tool mount 27 provided at the end of the wrist. By so doing, the weight of the wrist is reduced to improve the operation characteristic or performance of the robot.

As has been described, according to the invention, it is possible to easily obtain robot mechanisms suited for various requirements, through a simple local change using common essential parts and basic arrangement. This, of course, greatly contributes to the reduction of the production cost, due to common use of the essential parts and standarization of the design.

Figure 11A:
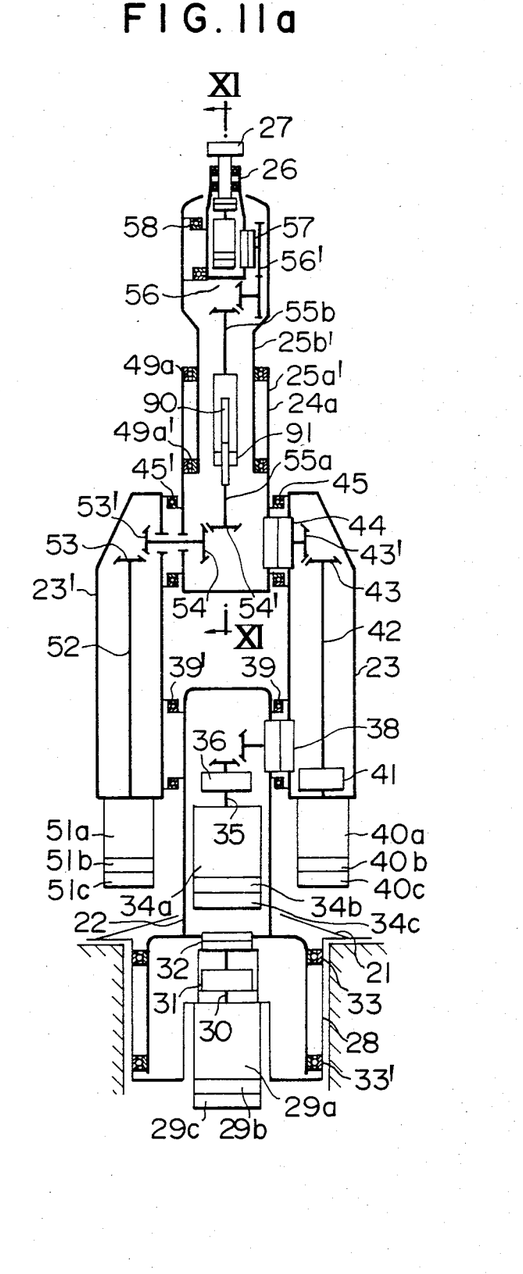
Figure 11B:
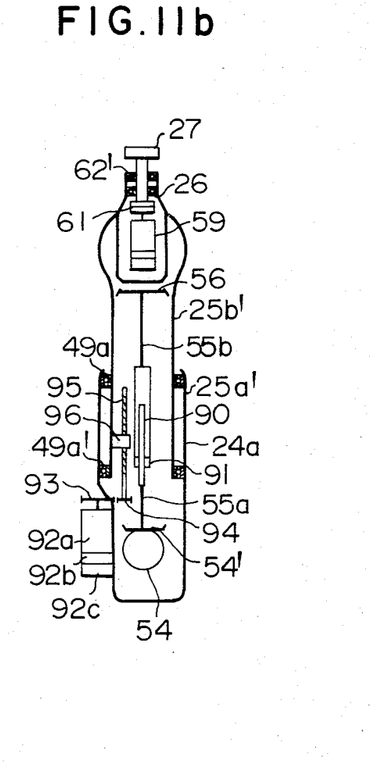

FIGS. 11a and 11b show a different embodiment in which the forearm 24 of the articulated industrial robot shown in FIGS. 5a and 5b is substituted by a stretchable forearm 24a intended for assembling or processing articles or workpieces by conveying the latter detouring above or around any obstruction around the industrial articulated robot. In this embodiment, the forearm 24a includes an upper half part 25a' rotatably connected to the ends of the upper arms 23, 23' through bearings 45, 45', a lower half part 25b' slidably supported through linear bearings 49, 49a' by the free end of the upper half part 25a' and carrying a wrist 26 for rotation around the $Y_3$ and $X_2$ axes, an upper half part 55a of a rotary shaft carrying at its one end a bevel gear 54' and provided at its other end with a spline shaft 90, a lower half part 55b of the rotary shaft provided at its one end with the spline boss 91 for engaging the spline shaft 90 and at its other end with a bevel gear 56, a rotary driving source (such as a D.C. servo motor) 92a mounted on the upper half part 25a', a gear 93 fixed to the output shaft of the rotary driving source 92a, a lead screw 95 having a gear 94 fixed thereto and meshing with the gear 93 and rotatably supported by the upper half part 25a', and a nut 96 secured to the lower half part 25b' and meshing with the lead screw 95. In all other respects the arrangement of FIGS. 11a–11b is substantially equivalent to that shown in FIGS. 5a and 5b.

In operation, as the rotary driving source 92a is energized, the lead screw 95 is rotated to extend and retract the lower half part 25b' of the upper arm relatively to the upper half part 25a', i.e. to stretch the forearm 24a. This arrangement permits a processing of a work situated at a comparatively remote place by the tool held by the tool mount 27, detouring above or around any obstruction residing between the robot and the work, or to assemble a part carried by the hand 27 on an assembly detouring above or around the obstruction.

Figure 12:
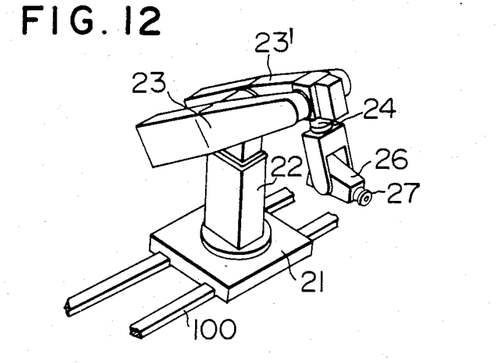
FIG. 12 shows a different embodiment in which each of the industrial robots shown in FIGS. 5a, 7, 7, 10, and 11a run along a track laid on the floor.
Figures 13, 14:
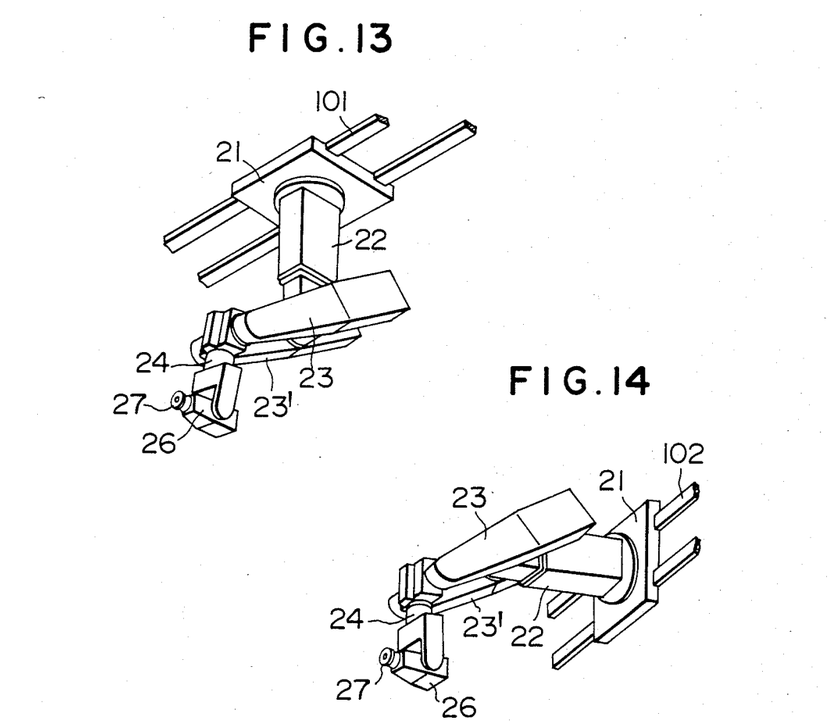
FIG. 13 shows a different embodiment in which the articulated industrial robot runs along a track suspended from a ceiling.
FIG. 14 shows a different embodiment in which the articulated industrial robot runs along a track hung from a vertical wall.

In some cases, the articulated industrial robot is required to move in synchronization with the moveement of articles conveyed by a conveyor or the like (not shown) to effect a processing or assembling. To this end, any type of the industrial robot heretofore described can be mounted on a carriage or truck adapted to run along a track 100 laid on the floor (See FIG. 12), track 101 suspended from the ceiling (See FIG. 13) or a track hung from vertical wall (See FIG. 14), by the power from the driving source (not shown) such as a motor mounted along the track 100, 101, 102.

Figure 15:
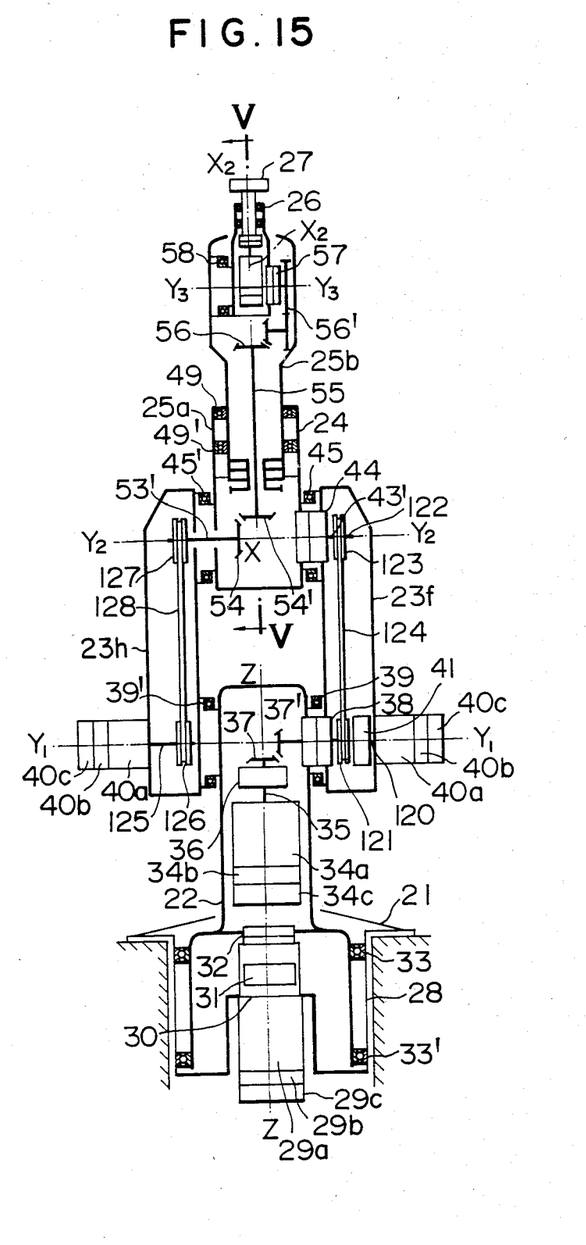

In the embodiments heretofore described, the driving source 40a for driving the forearm 24 is attached to the rear end of the upper arm 23, while the rotary driving source 51a for the wrist 26 is secured to the rear end of the upper arm 23'. These driving sources 40a, 51a transmit the driving power through their output shafts 42, 52 and respective pairs of bevel gears 43, 43'; 53, 53'. This arrangement, however, is not essential, and can be substituted by an equivalent arrangement a typical one of which is shown in FIG. 15. More specifically, in the arrangement shown in FIG. 15, the rotary driving source 40a for the forearm 24 is attached to one side of the upper arm 23f. The output shaft 120 is extended through a safety brake 41. A belt pulley or a sprocket wheel 121 is attached to this output shaft 121. On the other hand, a belt pulley or sprocket wheel 123 is attached to the input shaft of the reduction gear 44. The driving power is transmitted through a timing belt or a chain 124 stretched between the pulleys or sprocket wheels 121 and 123. Alternatively, it is possible to provide an arrangement wherein the driving power is transmitted through a timing belt or a chain 128 stretched between a belt pulley or sprocket wheel 126 fixed to the output shaft 125 of a wrist driving source 51a fixed to the side surface of the upper arm 23h and a belt pulley or sprocket wheel 127 fixed to the input shaft 53' connected to the bevel gear 54.

Figure 16:
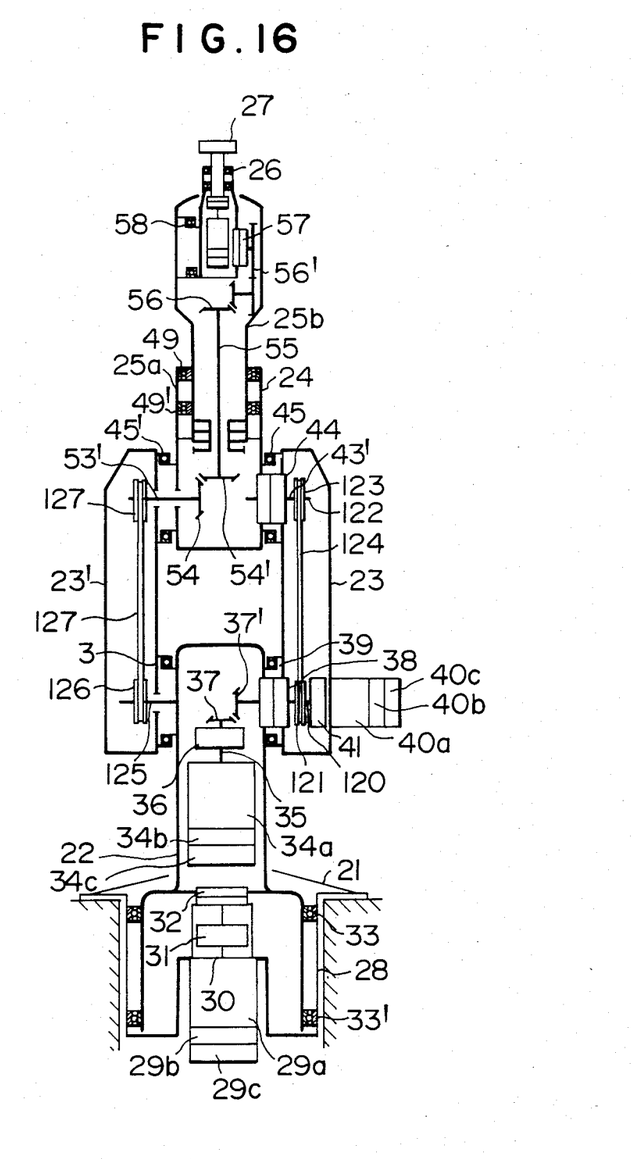
FIG. 16 is an exploded sectional view of a modification of the articulated industrial robot shown in FIG. 15.

In the case where there is no need for change of the posture of the wrist 26, the output shaft 125 may be fixed to the supporting post 22 as shown in FIG. 16.

A brief explanation will be made hereinunder as to a controller 110 for controlling the articulated industrial robot of the invention. The controller 110 includes a microprocessor unit 113 adapted for enabling an arithmetic control of the rotary driving sources 29a, 34a, 40a, 51a, 46a (92a), 59a, a read only memory (ROM) 111 storing operation program, D/A converters 114a to 114f for converting digital signals into analog signals, D.C. servo amplifiers 115a to 115f for driving respective D.C. motors 29a, 34a, 40a, 51a, 46a (92a), 59a, counters 112a to 112f for counting the pulse signals from the rotary encoders 81a to 81e, 93 and adapted to memorize the positions in a spherical coordinate system, an operation unit 116 adapted for performing arithmetic operation for determining velocities and locie in accordance with the program stored in the ROM 111 on the basis of the position in spherical coordinate memorized in the counters 112a to 112f, a function table 117 and so forth. A reference numeral 118 denotes a teaching box, while 119 denotes a central controller or a peripheral equipment for giving instructions such as a starting instruction.

In operation, the microprocessing unit 113 reads out the program stored in the ROM 111, and makes a processing using the operation unit 116 and the function table 117 to produce suitable signal for making the hand of the robot follow the predetermined locus, from the data concerning the present position in the spherical coordinate derived from the counters 112a to 112f. The thus obtained signal, in the form of a digital signal, is then delivered to the D/A converters 114a to 114f which in turn deliver analog signals to D.C. servo amplifiers 115a to 115f. The amplifiers then drive respective D.C. motors 29a, 34a, 40a, 51a, 46a (92a), 59a to permit the articulated industrial robot to perform the desired task. The tachogenerators 29b, 34b, 40b, 51b, 46b (92b), 59b are provided for feeding back the speeds of D.C. motors 29a, 34a, 40a, 51a, 46a (92a), 59a to the D.C. servo amplifiers 115a to 115f to effect the speed control of these motors.

As has been described, according to the invention, there is provided an articulated industrial robot comprising a base, a supporting post provided on the base, a forearm provided at its end with a wrist having at least one degree of freedom, and a pair of upper arms pivotally connected at their one ends to the supporting post and at their other ends to the forearms, the upper arms being arranged at both sides of the supporting post and the forearm.

It is, therefore, possible to arrange such that the driving and controlling system for the forearm is mounted on one of the upper arms while the other upper arm carries the wrist posture driving and controlling system. This arrangement advantageously permits the industrial robot to be modified to realize various degrees of freedom or functions in compliance with the customer's demands without necessitating substantial change of major parts and fundamental design. In other words, it is possible to produce industrial robots meeting various demands making common use of major parts while attaining simplification of mechanism advantageously. In particular, in the case where the demand is only to maintain the wrist in a constant posture, such a demand can easily be satisfied my a minimum modification simply through replacing the above-mentioned other upper arm, to a great advantage from an economical point of view.

In addition, according to the invention, the rotary driving sources such as D.C. servo motors are used as the driving sources of the upper arms, forearm and wrist, while transmitting mechanisms such as upper arm connecting mechanism, forearm mechanism, and wrist posture connecting mechanism are constituted by rotary transmission members such as rotary shafts, gears (bevel gears) and so forth, with the reduction gears provided near the output ends of respective transmission systems. Consequently, the power is transmitted with much reduced loss, and the construction of the transmission systems is very much simplified to achieve a remarkable reduction in the production cost.

According to another aspect of the invention, the forearm is constituted by an upper half part and a lower half part which is rotatable relatively to the upper part half part around the longitudinal axis and extendable and retractable in the longitudinal direction, to impart a rotational and stretching functions to the forearm. It is, therefore, possible to move the tool or a part carried by the hand detouring peripheral obstructions from all directions to effect mechanical processing or assembling on an object spaced by the robot by the obstruction or to effect a processing or assembling on an object remote from the robot detouring above the peripheral obstruction.

What is claimed is:

1. An articulated industrial robot comprising:
   a base;
   a supporting post mounted on said base to be rotatable around a vertical axis, a first drive motor for said supporting post and mounted on said base;
   a supporting post connecting means for connecting the output of said supporting post drive motor to said supporting post through a reduction gear;
   a first safety brake means provided in said supporting post connecting means and interposed between the output of said supporting post drive motor and said reduction gear;
   a wrist for supporting a tool mount and a tool drive motor which drives said tool mount through a reduction gear;
   a forearm provided at a tip end thereof with said wrist which is rotatable around a first horizontal axis;
   a pair of upper arms each having a forward end pivotally connected to said supporting post to be rotatable around a second horizontal axis and a rearward end rotatable about a third horizontal axis, said upper arms being disposed at both outer sides of said supporting post and said forearm;
   an upper drive motor mounted in said supporting post for providing an upward rotary output;
   upper arm connecting means including a first pair of bevel gear means for converting the upward rotary output of said upper arm drive motor into an output around the second horizontal axis, and a reduction gear means for transmitting the output around the second horizontal axis to one of said upper arms;
   a second safety brake means provided in said upper arm connecting means and interposed between the rotary output of said upper arm drive motor and said bevel gear means;
   a further drive motor for said forearm provided at a rearward end of one of said upper arms with a rotary output of the further drive motor being directed toward the tip end of said upper arms along a length thereof;
   a forearm means including a second pair of bevel gear means for converting the rotary output of said drive motor for said forearm to an output around the third horizontal axis and a reduction gear means for transmitting the output around the third horizontal axis to said forearm;
   a third safety brake means provided in said forearm connecting means and interposed between the rotary output of said drive motor for said forearm and said second pair of bevel gear means;
   a wrist drive motor provided at a rearward end of the other of said upper arms, with a rotary output of the wrist drive motor being directed toward a tip end of the other of said upper arms along the length thereof; and
   a wrist posture controlling connecting means including a third pair of bevel gear means for converting the rotary output of said wrist drive motor into an output around the third horizontal axis, a fourth pair of bevel gear means for converting the output from said third pair of bevel gear means into an output around a longitudinal axis of said forearm, a fifth pair of bevel gear means provided in said forearm for cooperating with a pair of gears to convert the output from said fourth pair of bevel gear means into a rotary output around the first horizontal axis, and a reduction gear means for transmitting the rotary output from the pair of gears to said wrist.

2. An articulated industrial robot as claimed in claim 1, wherein said forearm includes an upper portion rotatably connected to said upper arms and a lower portion provided with said wrist, said lower portion being rotatable relative to said upper portion around a longitudinal axis to thereby impart a degree of freedom of rotation to said forearm, and further comprising a lower portion connecting means which includes a drive motor mounted on said forearm for drivingly rotating said lower portion, a pair of gears for transmitting the rotary output of said drive motor to a rotary shaft of said lower portion, and a reduction gear means for connecting the output of the pair of gears to said lower portion.

3. An articulated industrial robot as claimed in claim 1, wherein said forearm includes an upper portion rotatably connected to said upper arms and a lower portion provided with said wrist, said lower portion being extendable and retractable in the longitudinal direction to thereby impart a degree of freedom for enabling a stretching function to said forearm, and further comprising a lower portion which includes another drive motor mounted on said forearm for providing a rotary drive for stretching said lower portion, a further pair of gears for transmitting the rotary output of said another drive motor to the interior of said lower portion, and a nut-screw drive for connecting said rotary output of said another drive motor to said lower portion.

* * * * *